United States Patent [19]

Crisp

[11] Patent Number: 5,025,775
[45] Date of Patent: Jun. 25, 1991

[54] AIR DELIVERY SYSTEM AND OVEN CONTROL CIRCUITRY COOLING SYSTEM FOR A LOW PROFILE IMPINGEMENT OVEN

[75] Inventor: Duane L. Crisp, Freeland, Pa.

[73] Assignee: Lincoln Foodservice Products, Inc., Fort Wayne, Ind.

[21] Appl. No.: 532,600

[22] Filed: Jun. 4, 1990

[51] Int. Cl.[5] .............................. F24C 15/32
[52] U.S. Cl. .................. 126/21 A; 126/21 R; 99/474
[58] Field of Search ............... 126/21, 21 A; 99/474, 99/475; 219/388

[56] References Cited

U.S. PATENT DOCUMENTS

| | | | |
|---|---|---|---|
| 3,384,068 | 5/1968 | Terry et al. | 126/21 A |
| 3,908,533 | 9/1975 | Fagerström et al. | |
| 3,926,106 | 12/1975 | Deusing et al. | |
| 4,462,383 | 7/1984 | Henke et al. | 219/388 |
| 4,539,469 | 9/1985 | Gigandet | 219/412 |
| 4,626,661 | 12/1986 | Henke | |
| 4,701,340 | 10/1987 | Bratton et al. | 126/20 |
| 4,757,800 | 7/1988 | Shei et al. | |
| 4,831,238 | 5/1989 | Smith et al. | 219/388 |

Primary Examiner—Carroll B. Dority
Attorney, Agent, or Firm—Jeffers, Hoffman & Niewyk

[57] ABSTRACT

An impingement oven comprising a cooking chamber, a conveyor, and a plurality of plenums. A plurality of finger duct members attached to each plenum are located above and below the conveyor. Adjacent sidewalls of adjacent duct members are tapered relative to one another to define an outwardly tapered air return space in a direction away from the plenum. A plurality of air deflectors are secured to an inner surface of each duct member for deflecting air through a plurality of nozzles located on the duct member. A partition between the plenums segregates return air flowing from the cooking chamber to adjacent plenums. For at least two ovens stacked one above the other, the invention further includes a cooling system having a cooling compartment and a central cooling duct for drawing cool air from near floor level and moving the cool air upwardly to cool and control circuitry for each of the stacked ovens. The cool air is then exhaused out of the cooling compartment to substantially insulate the oven control circuitry from the radiating heat of the oven below.

13 Claims, 5 Drawing Sheets

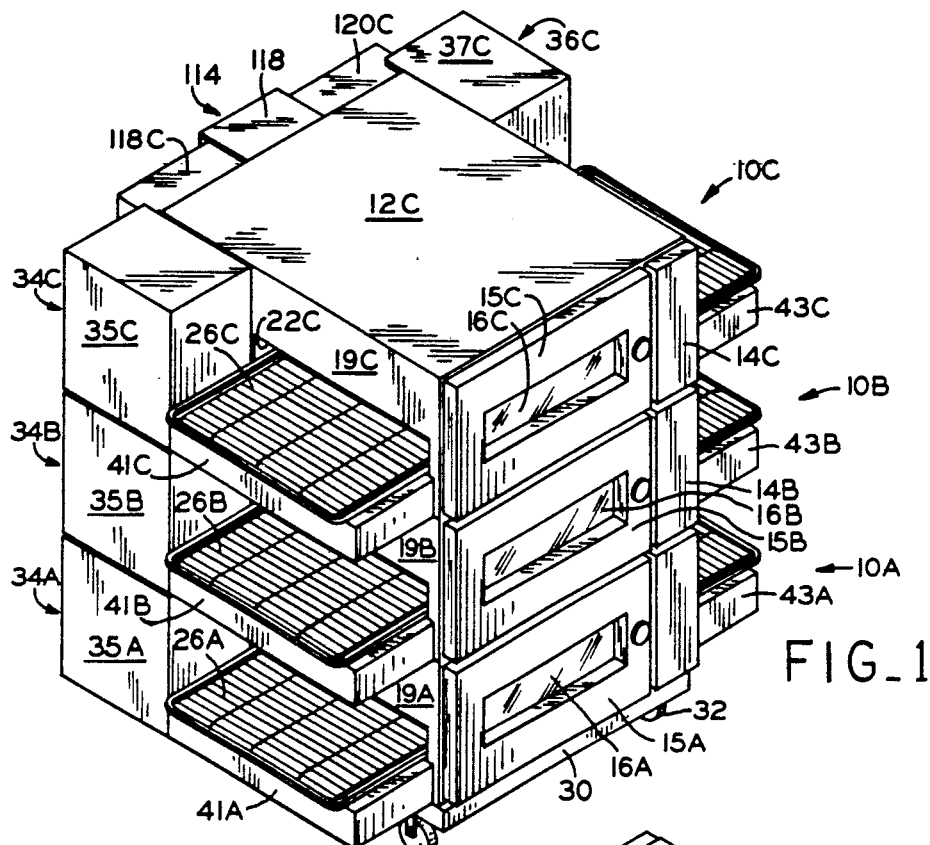
FIG_1
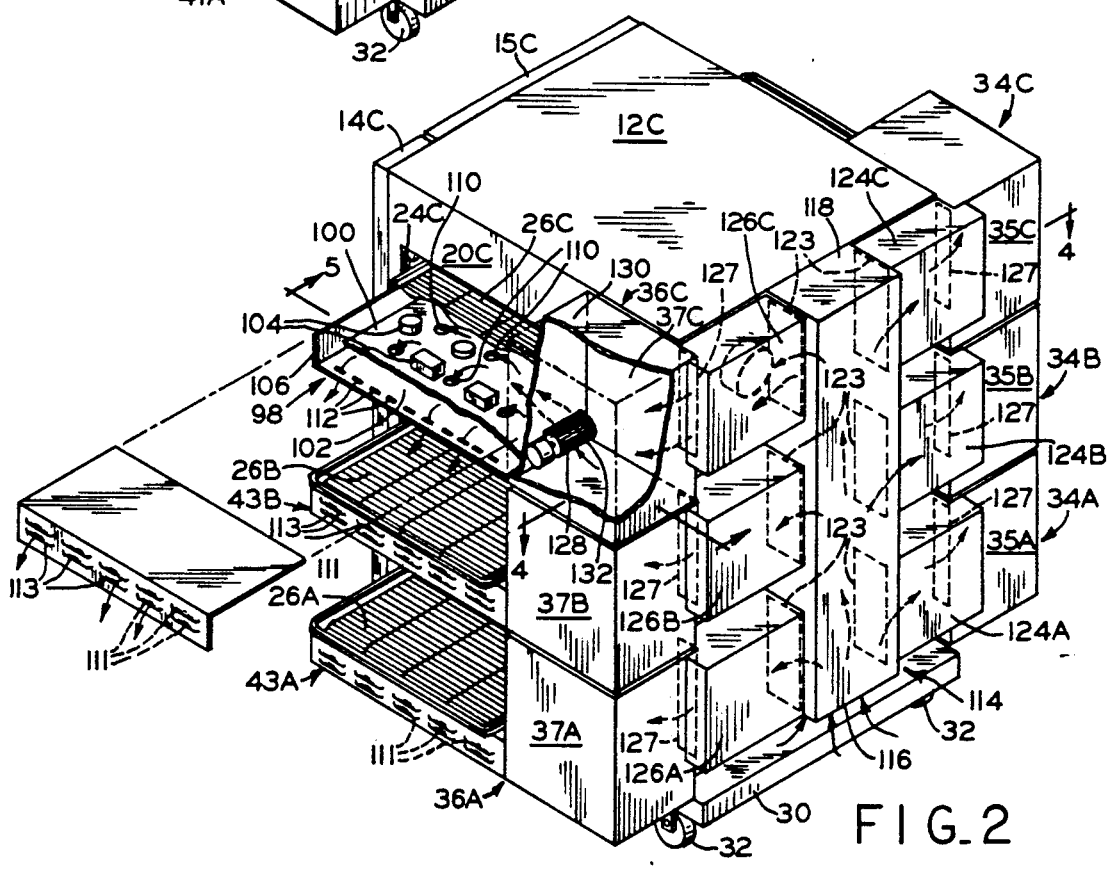
FIG_2

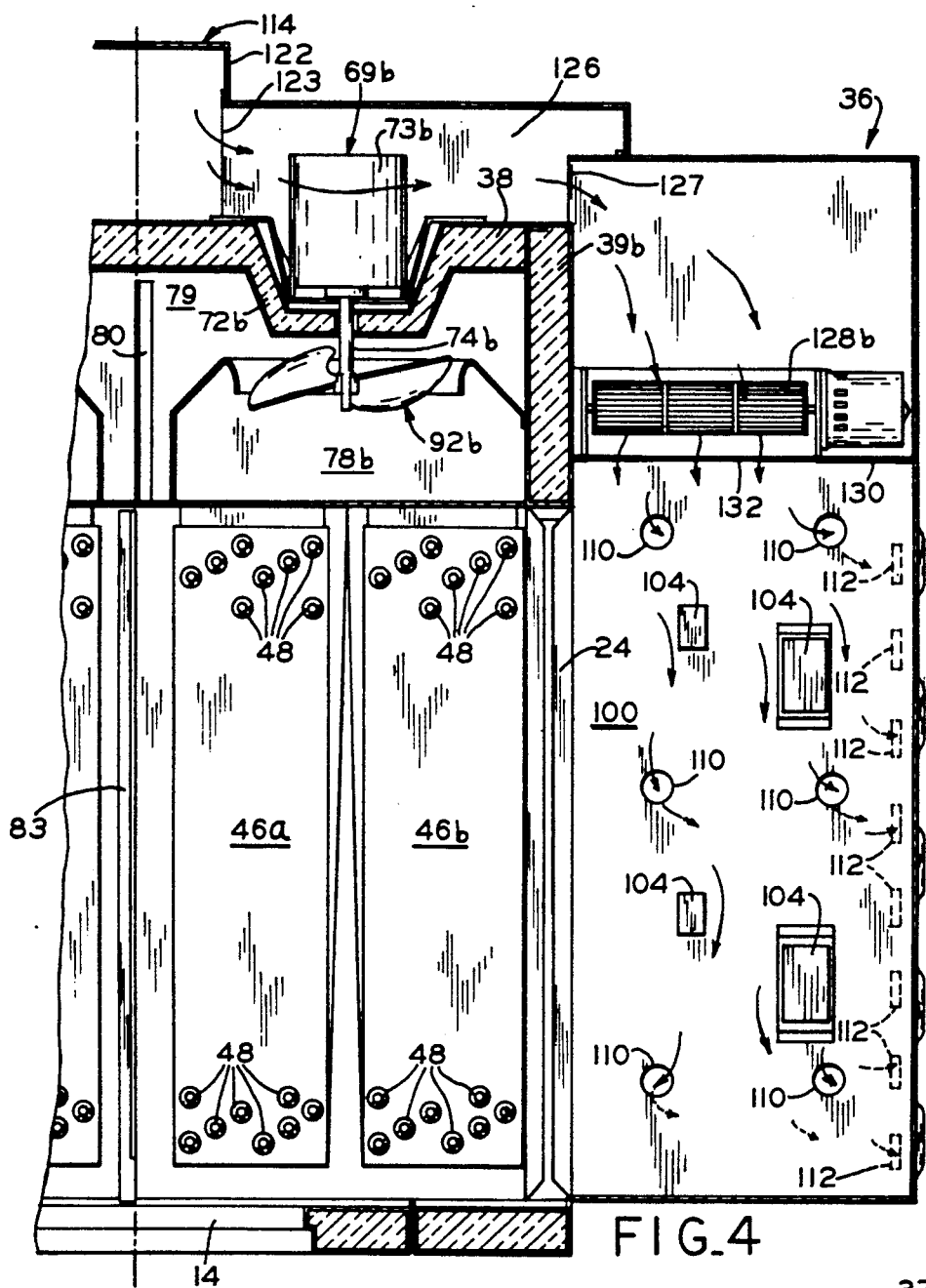
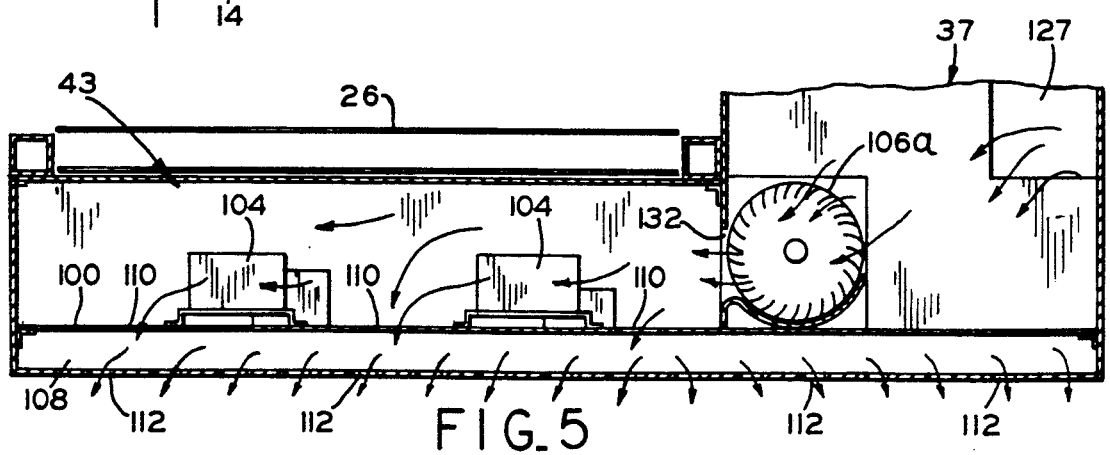

AIR DELIVERY SYSTEM AND OVEN CONTROL CIRCUITRY COOLING SYSTEM FOR A LOW PROFILE IMPINGEMENT OVEN

BACKGROUND OF THE INVENTION

This invention relates to food preparation ovens and more particularly to food preparation ovens for preparing pizza and similar types of food products. Specifically the invention relates to an impingement oven wherein food products are baked or cooked by means of jets of hot gaseous fluid such as hot air and wherein the hot air jets are impinged directly upon localized areas of the food product.

In the fast food restaurant business, it is important that food be prepared very quickly and that the amount of kitchen space required for food preparation is minimized so that productivity per square foot of kitchen floor space is maximized. Due to the ever increasing competitiveness of the fast food business, restaurants need to be able to serve dinners ever more quickly thus requiring that food preparation time be reduced. Restaurants seek to be able to serve more customers without adding additional space in seating areas.

Quick preparation of food is especially important for those restaurants which serve pizza since it takes longer to prepare. One of the reasons that preparation time for pizzas is longer than for other fast foods is the nature of the pizza product. As opposed to other types of fast foods which primarily consist of meat products such as beef, chicken, or fish, all of which can be prepared rather quickly by grill frying or deep fat frying, pizza consists of a combination of a dough shell and a variety of toppings such as various types of cheeses, meats, and vegetables, i.e., onions, mushrooms, green peppers and the like, all of which must be adequately cooked rather than deep fried and which, therefore, require special handling. It is thus more difficult to cook a pizza and similar food products very quickly as opposed to preparing items such as hot dogs, hamburgers, fried chicken, and the like.

To increase the speed in which pizzas are prepared, it is not sufficient to merely increase the temperature of the oven in which the pizza is cooked. An increase in temperature could result in breakdown of the components of the pizza, and could possibly result in burning the pizza.

Advances have been made in the speed at which pizzas may be prepared by providing impingement ovens wherein a conveyor transports food products through an oven cavity. U.S. Pat. Nos. 4,701,340, and 4,626,661, both of which are assigned to the assignee of the present invention and are incorporated herein by reference, disclose impingement ovens which have been commercially very successful.

In conventional impingement ovens, the air, after its distribution through the plenum and the impingement finger ducts, goes back to the fan by way of the top, bottom and sides of the oven. Some of the air escapes through openings in the side walls of the oven through which the conveyor extends thereby resulting in lost energy and reducing the efficiency of the oven. It is therefore desired to provide an impingement oven wherein the heated air being recirculated to the fan is maximized, and the amount of cool air entering the fan from the conveyor openings is minimized.

Axial fans are conventionally used with impingement ovens because of their superior air movement characteristics since they provide high velocity, low pressure air flow. The height of prior art impingement ovens has been dictated by the size of the axial fans which have been used with such ovens. Therefore, one approach to reducing oven height is to use multiple axial fans, whereby each fan would have a smaller diameter than the single fan which is used with prior art impingement ovens. An impingement oven of reduced height allows a greater number of ovens to be stacked upon one another to increase the productivity of the kitchen floor space without sacrificing food preparation time or food quality. However, a problem with using multiple axial fans in impingement ovens is that the fans tend to set up lateral air flow across the oven cavity, thereby starving one of the fans of return air. Another problem is that a helical air flow effect may be set up in the plenum, thereby creating uneven pressures in the impingement finger ducts and causing an uneven supply of thermal energy to the food product. It is, therefore, desired to provide an impingement food preparation oven having multiple axial fans in which an even air flow distribution is obtained from each plenum into the finger ducts.

As indicated, impingement ovens recirculate air by means of a fan and plenum assembly for reheating impinging air in the cooking process. Generally, the fan withdraws air from the cooking area and recirculates it over a heat source from which it is drawn and directed into a plenum for distribution to various finger ducts, which direct the air to the product to be cooked. A prerequisite for an evenly cooked food product is the uniform distribution of reheated air through impinging nozzles located along each finger duct. A problem with conventional impingement ovens is that the air traveling through the finger ducts tends to remain therein and exits through the nozzles furthest from the plenum. As a result, a nonuniform impingement occurs with greater heating taking place at points furthest from the plenum along each finger duct. Therefore, it is desired to provide an impingement oven in which the impinging jets of air are uniformly distributed through each nozzle on the finger duct.

Another problem with conventional impingement ovens is the effect of escaping air on the oven control circuitry, which controls and monitors the oven during the cooking process. For example, most oven control boxes containing oven control circuitry are mounted directly on, or in close proximity to, the oven, and if this environment becomes too warm due to escaping radiating heat from the cooking chamber, the oven circuitry may provide improper operation or monitoring of the cooking process, or even prematurely fail. Naturally, the occurrence of either of these two situations is highly undesirable since either will result in an improperly cooked food product and expensive maintenance.

The above problem is particularly compounded in a multiple stacked food preparation oven arrangement wherein the upwardly radiating heat from the lowermost oven contacts and heats the oven control circuitry or the mounting surfaces on which the circuitry is disposed. The two primary sources of this escaping radiating air are generally the cooking chamber and the conveyor device extending through the horizontally disposed oven passageway for conveying cooked food products from the cooking chamber. Another source of escaping radiating heat can be the oven plenum, however, this potential source is generally of secondary importance since it is usually disposed near the back of the oven, while the oven control circuitry is generally disposed near the front of the oven. In a multiple stacked food preparation oven arrangement, the close proximity of the uppermost oven control circuitry and mounting surfaces to the lowermost oven subjects the circuitry and mounting surfaces to a much hotter environment than if the ovens were situated side by side, thereby requiring a great amount of forced cooling air to lower the temperature of the control circuitry environment.

Attempts to prevent the overheating of the oven control circuitry or the mounting surfaces on which the circuitry is disposed, include directing forced air against the circuitry and the mounting surfaces to cool them from the upward radiating heat of the lowermost oven. One solution that has worked well in cooling the oven control circuitry is described in U.S. Pat. No. 4,539,469, which is assigned to the assignee of the present invention. This patent discloses the use of a double wall assembly having a mounting wall on which the oven circuitry is disposed and an exterior wall spaced apart from the mounting wall. The mounting wall and the exterior wall form therebetween a ventilating compartment. Thus, the double wall assembly provides a continuous flow of cooling air between the mounting wall and exterior wall to insulate the oven control circuitry from the high temperatures of radiating heat. This double wall assembly has performed effectively to cool the oven control circuitry.

Notwithstanding this successful performance, efforts are continuously directed toward increasing the efficiency of the cooling process. In U.S. Pat. No. 4,539,469, the inlet of the ventilating compartment is located on the back wall of each oven. Thus, the cooling air entering the uppermost ovens is warmer than the cooling air entering the bottom oven near the floor. It is thus desired to provide the same cooling air that enters the bottom of the oven to the uppermost ovens.

SUMMARY OF THE INVENTION

The present invention overcomes the disadvantages of the above described prior art ovens for preparing pizza and similar types of food products by providing an improved apparatus.

Generally, the present invention provides, in one form thereof, an impingement oven having a cooking chamber, a conveyor, and a plurality of plenums. A plurality of duct members attached to each plenum are located above and below the conveyor. Adjacent sidewalls of adjacent duct members are tapered relative to one another to define an outwardly tapered air return space in a direction away from the plenum. A plurality of air deflectors are secured to an inner surface of each duct member for deflecting air through a plurality of nozzles located on the duct member. A partition between the plenums segregates return air flowing from the cooking chamber to adjacent plenums. For at least two ovens stacked one above the other, the invention further includes a cooling system having a cooling compartment and a central cooling duct for drawing cool air from near floor level and moving the cool air upwardly to cool the control circuitry for each of the stacked ovens. The cool air is then exhausted out of the cooling compartment to substantially insulate the oven control circuitry from the radiating heat of the oven below.

One advantage of the oven according to the present invention is that the return air flow tends to be forced away from the plenum so that more heated air is recirculated to the rear of the cooking chamber, thus decreasing the flow of cold air to the cooking chamber from the conveyor opening.

Another advantage of the oven according to the present invention is that the flow of heated air escaping the oven through the conveyor opening is decreased.

Yet another advantage of the oven according to the present invention is that the flow of impinging air is more evenly distributed from the front to the rear of each duct fingers.

A still further advantage of the oven according to the present invention is that the flow of return air entering each plenum is separated to prevent each associated fan from being starved for air, thus maximizing the flow of air through each plenum.

Still yet another advantage of the oven of the present invention is that the air temperature entering a first plenum may be different than that entering an adjacent plenum to allow different rates of heating of the food product as it moves along the conveyor.

Yet a further advantage of the oven according to the present invention is that the cooling system for the oven control circuitry is provided which substantially insulates the circuitry from escaping radiant heat.

A yet further advantage of the present invention is that the air entering the cooling system for the oven control circuitry is cool air from near floor level, thus providing the coolest air within the vicinity of the oven.

A still further advantage of the oven according to the present invention is that it permits rapid preparation of food products while providing a product with superior flavor, appearance, and texture.

Yet another advantage of the oven according to the present invention is that a more efficient transfer of large amounts of heat energy into the food product is achieved while simultaneously providing enhanced cooling of the cooling system for the oven control circuitry.

Yet still another advantage of the oven according to the present invention is that the scoop fan blades are rounded to change the center of gravity, thus better balancing the fan.

The food preparation apparatus according to the present invention, in one form thereof, provides an oven chamber including a conveyor for moving a pan containing a pizza or other food products through an oven chamber. The food product may also be placed directly on the conveyor. A plurality of finger duct members are located above and below the conveyor. Each of the duct members includes a plurality of nozzles and a pair of sidewalls. The nozzles are shaped and positioned to direct a plurality of discreet streams of impinging air toward the conveyor. A plenum is connected to the duct members and is in fluid communication therewith to provide a flow of air to the duct members. The plenum includes a front wall having a plurality of openings connected to the respective duct members and an air intake opening therein. Burners are provided for heating the flow of air before it enters the plenum. Fans are provided for drawing the air from the cooking chamber into the plenum. Adjacent sidewalls of adjacent ducts are tapered relative to one another and define an outwardly tapered air return space in a direction away from the plenum.

The present invention, in one form thereof, includes an oven chamber for cooking a food product therein and a conveyor for supporting the food product. A plurality of finger duct members are mounted in the cooking chamber and are spaced from the conveyor. Each of the duct members includes a plurality of nozzles therein. The nozzles are shaped and positioned to direct a plurality of discreet streams of impinging air toward the conveyor. A plenum is connected to the duct members and is in fluid communication therewith to provide a flow of air to the duct members. The plenum has a front wall having a plurality of openings connected to the respective duct members and a rear wall having an opening therein. Burners are provided for heating the flow of air before it enters the plenum. A fan is provided for drawing air from the chamber into the plenum. A plurality of air deflectors are secured to an inner surface of each of the duct members for deflecting air through the nozzles. These deflectors are axially spaced along the duct member.

The present invention still further includes, in one form thereof, a food preparation apparatus including an enclosure having a front side and a back side. The enclosure also includes a cooking chamber for cooking a food product therein and a conveyor for supporting the food product. First and second sets of finger duct members are mounted in the cooking chamber and are spaced from the conveyor. Each of the duct members includes a plurality of nozzles therein which are shaped and positioned to direct a plurality of discreet streams of impinging air toward the conveyor. First and second plenums are respectively connected to the first and second sets of duct members for supplying air to the duct members. Each of the plenums has a front wall with a plurality of openings connected to the respective duct members and a rear wall with an opening therein. First and second burners are respectively associated with the first and second plenums for heating the air supplied to the duct members. First and second fans are provided for drawing air from the cooking chamber into their respective plenums. The apparatus also includes a partition between the plenums to segregate return air flowing from the cooking chamber to the first and second plenums.

The present invention, in one form thereof, still further comprises a food preparation apparatus having at least two ovens stacked one above another. The upper oven is directly exposed to heat rising from the lower oven. Each of the ovens has a cooking chamber and oven control circuitry. Each oven further includes a cooling system for insulating and cooling the oven control circuitry from a source of radiant heat. The cooling system comprises a double wall assembly having a mounting wall including first and second sides wherein the oven control circuitry is mounted on the first side. An exterior wall is spaced apart from the second side of the mounting wall. The mounting wall and exterior wall define a compartment having an inlet for receiving a flow of cooling air and an outlet in the exterior wall for exhausting the flow of air. The cooling system further includes an air duct system for drawing cool air from near floor level and moving the flow of cool air upwardly and into the inlet, through the compartment, and out of the outlet for forming a circulation of cool air adjacent the oven. The oven control circuitry is substantially insulated from the radiant heat by the flow of cool air between the mounting wall and the exterior wall.

BRIEF DESCRIPTION OF THE DRAWINGS

The above mentioned and other features and objects of this invention and the manner of attaining them, will become more apparent and the invention itself will be better understood by reference to the following description of an embodiment of the invention taken in conjunction with the accompanying drawings, wherein:

FIG. 1 is a front perspective view of a stack of ovens in accordance with a preferred embodiment of the present invention;

FIG. 2 is a rear, partially broken away perspective view of the embodiment of FIG. 1;

FIG. 4 is a sectional view of the oven taken along line 4—4 of FIG. 2 showing the air flow through the control circuitry;

FIG. 5 is a sectional view of the control assembly taken along line 5—5 of FIG. 2 showing the air flow through the control circuitry;

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or of the invention in any manner.

DESCRIPTION OF THE PREFERRED EMBODIMENT

For purposes of clarity, large case letters indicate like elements among each oven. Small case letters indicate like elements within an individual oven.

Referring to FIGS. 1 and 2, three low profile ovens 10 are shown stacked on top of one another, with the stack of ovens 10A, 10B, and 10C supported by a frame 30 having a plurality of wheels 32 secured thereto so that the entire stacked assembly is moveable. Since the ovens are low profile, the total stack height of the oven assembly is substantially reduced as compared to a stack of conventional impingement ovens. More importantly, the low profile oven arrangement permits stacking of a greater number of ovens, and thus saves kitchen floor space.

Figure 8:
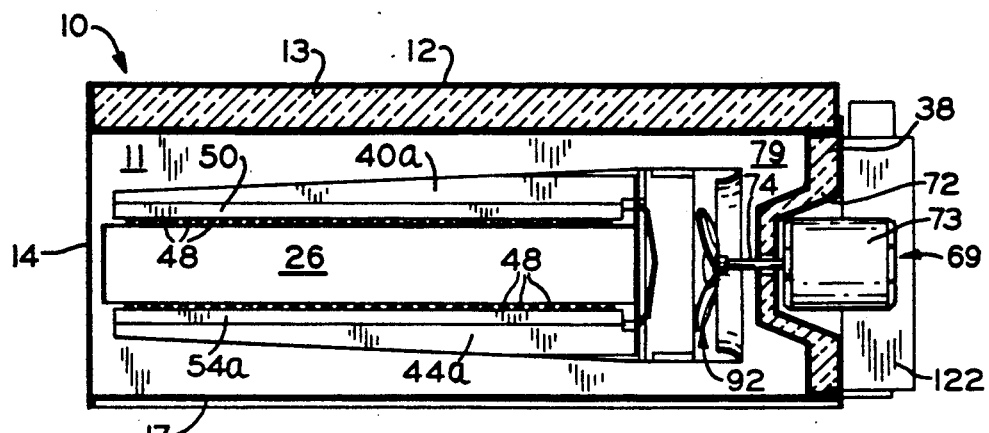
FIG. 8 is a partially sectional side view of one of the ovens of FIG. 1.

As shown in FIGS. 1, 2, and 8, each oven 10 includes an oven cavity 11 and a top wall 12. Top wall 12 is insulated with a layer of insulation material 13 which is located between the inner and outer panels of wall 12. The front wall of oven 10 is indicated at 14 and has a door i.e., door 15A. Door 15A also includes a window 16A for viewing food products as they are transported through the oven. The bottom wall of the oven 10 is indicated at 17. Sidewalls such as sidewalls 19A and 20A of oven 10 are also suitably insulated and include respective openings 22 and 24 therein. A conveyor 26 extends through side wall openings 22 and 24 so that food products placed on conveyor 26 may be transported through sidewall opening 24 and into oven cavity 11 to be baked therein. Food products leave oven cavity 11 through opening 22 in opposite sidewall 19 so that the food products may be removed from conveyor 26. The details of the construction of conveyor 26 do not form a part of the instant invention, and are further described in U.S. Pat. No. 4,462,383, which is assigned to the assignee of the instant application, which patent is incorporated herein by reference. A control panel (not shown) is provided for mounting the operating controls of oven 10 such as, by way of example but not by way of limitation, a temperature control and a conveyor speed control. Mounted on opposite sidewalls 19 and 20 of oven 10 are control assemblies 34A, 34B, 34C, 36A, 36B, and 36C, respectively. Control assembly 34C for example comprises an enclosure 35C and a circuitry compartment 41C. Likewise control assembly 36C comprises an enclosure 37C and a circuitry compartment 43C.

Referring now to FIGS. 3, 4, 6, and 8, oven 10 is provided with a plurality of finger ducts 40a, 40b, 42a, 42b, 44a, 44b, 46a, and 46b. Finger ducts 40a, 40b, 42a, and 42b are disposed above conveyor 26 and finger ducts 44a, 44b, 46a, and 46b are disposed below conveyor 26. Each finger duct includes a plurality of impingement apertures 48 for forming a plurality of well defined, high velocity air jets for impingement upon localized areas of food products supported on conveyor 26 to thereby heat and bake the food products. The finer ducts, include inner nozzle plates 50a, 50b, 52a, 52b, 54a, 54b, 56a, and 56b, spaced apart from respective outer nozzle plates 58a, 58b, 60a, 60b, 62a, 62b, 64a, and 64b to provide columnated jets of air through their respective aligned apertures 48.

Figure 7:
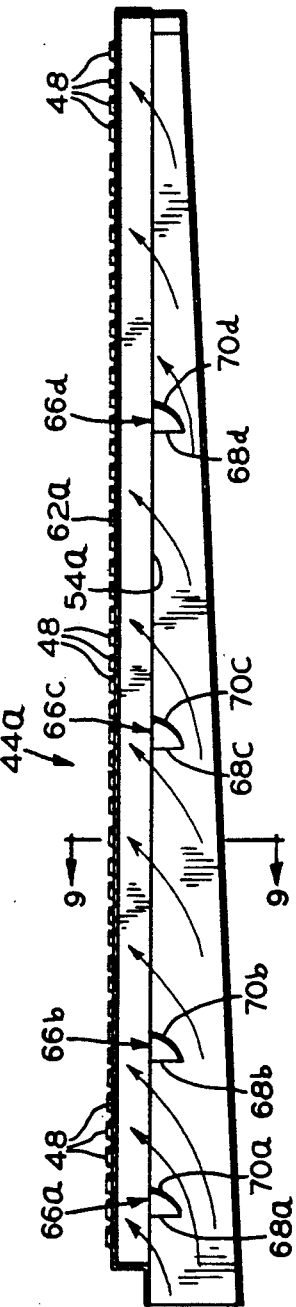
FIG. 7 is a longitudinal sectional view of an air duct of the present invention.
Figure 9:
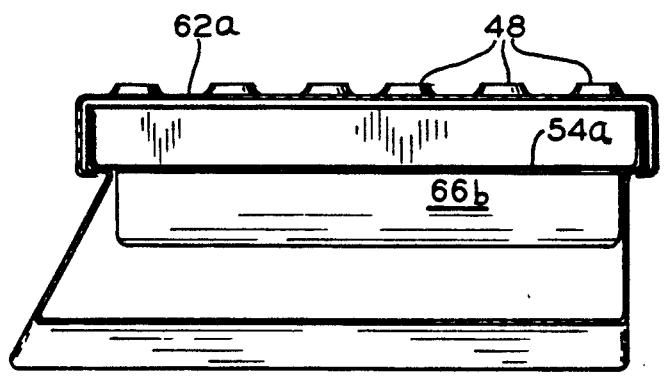
FIG. 9 is a transverse sectional view taken along line 9—9 of FIG. 7.

Referring in particular to FIGS. 7 and 9 there is shown a finger duct 44a having plurality of scoop-shaped deflector vanes 66a, 66b, 66c, and 66d, each attached to finger duct 44a and extending the width of finger duct 44a. Viewing in the direction of air flow, the front edge 68 of each deflector 66 is perpendicular to inner nozzle plate 54a, and the back edge 70 is outwardly curved and attached to finger duct 44a. As air flows through finger duct 44a, it tends to flow through the entire length of the duct and exit through those nozzles 48 which are near the end of finger duct 44a. Deflectors 66 provide a more uniform distribution of air flow from front to back by deflecting a portion of the air flow nearer the front of finger duct 44a out through nozzle 48 as shown in FIG. 7. In addition to providing a more uniform distribution of air flow, deflectors 66 redirect the flow of air without creating high and low pressures within finger duct 44a.

Figure 3:
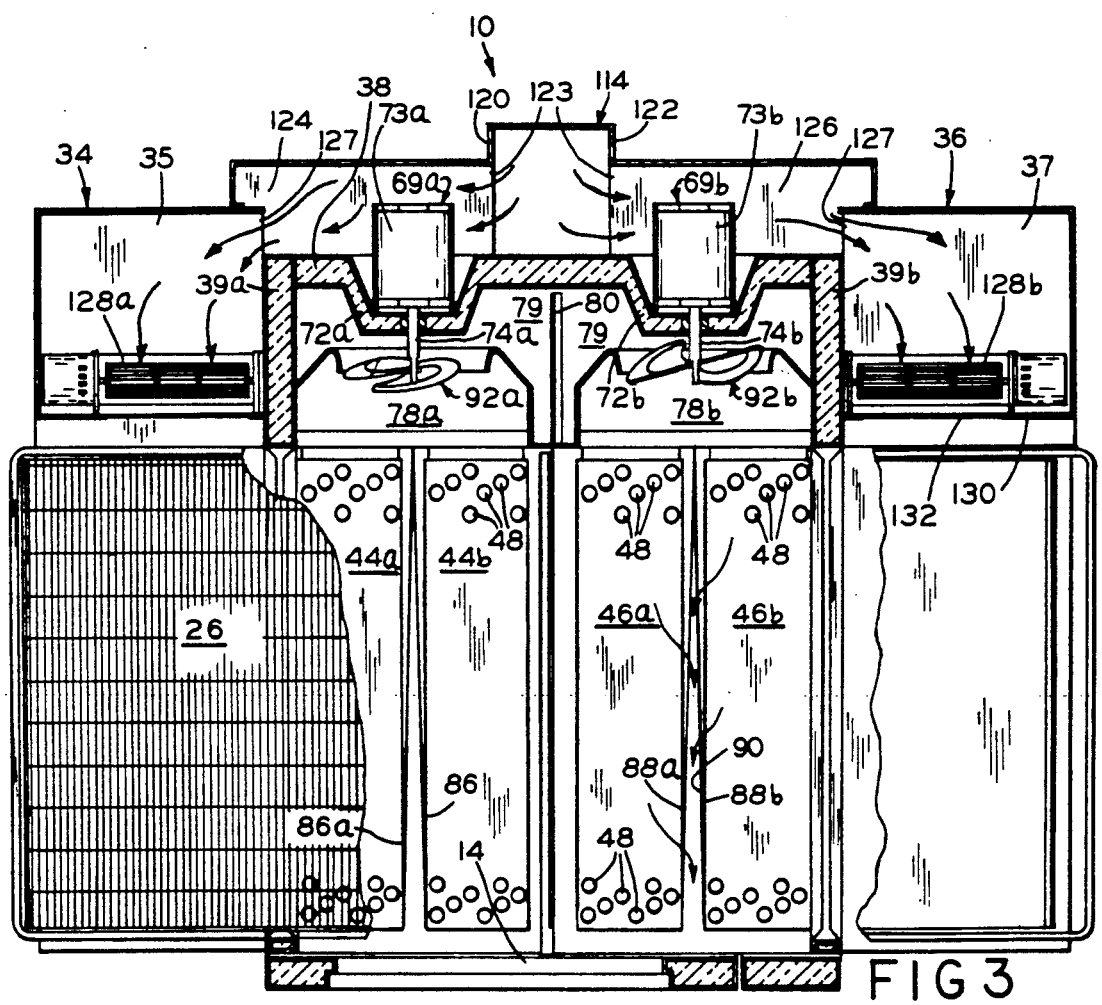
FIG. 3 is a partially broken away sectional top plan view of the embodiment of FIG. 1.

Referring to FIGS. 3 and 4, back wall 38 has two frustoconically shaped cavities 71a and 71b formed therein to provide internal motor shrouds 72a and 72b for housing fans 92a and 92b. Fans 92a and 92b include respective motors 73a and 73b and shafts 74a and 74b rotatably extending through inwardly extending portions 76a and 76b formed by cavities 71a and 71b in back wall 38. Plenums 78a and 78b are connected respectively to finger ducts 44a, 44b, and 46a, 46b, for supplying air thereto.

The air is heated by burners (not shown) mounted in sidewalls 39a and 39b. By providing one burner for each plenum, the air flowing through each plenum remains at a constant and stable temperature.

Figure 6:
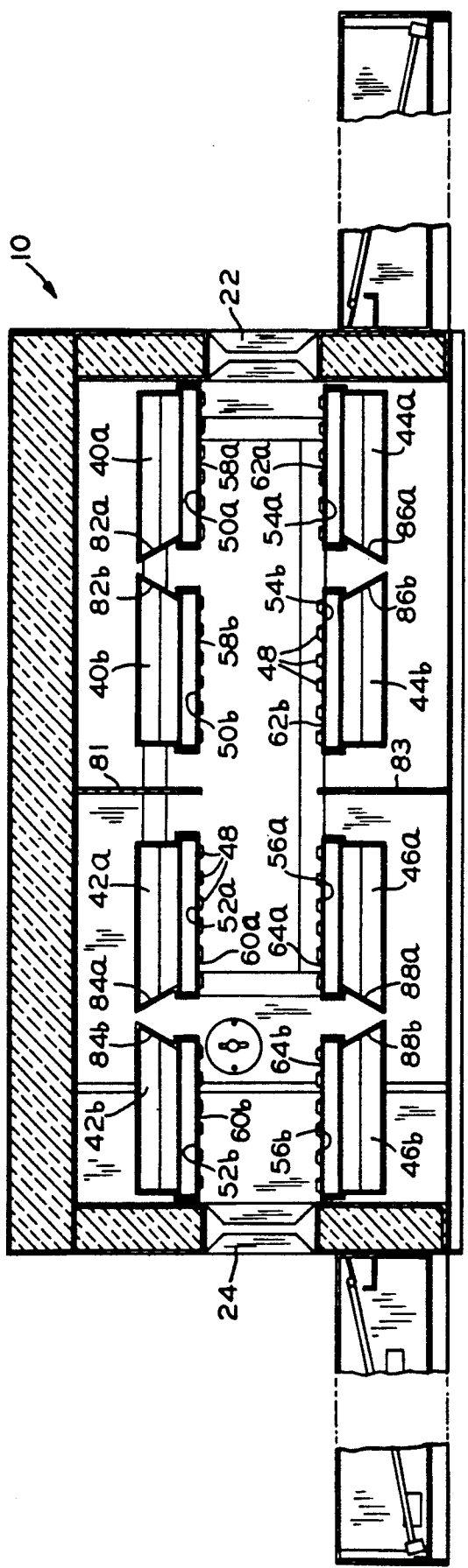
FIG. 6 is a cross-sectional view from the rear of one of the ovens of FIG. 1.

A septum 80 is located between plenums 78a and 78b and extends from the top to the bottom of the chamber 79 surrounding plenums 78a and 78b. Septum 80 comprises a flat sheet or plate to completely separate intake air between the plenums and thus eliminate and prevent a nonuniform flow of return air toward either one of the fans, which otherwise would starve the other fan of air. In addition to septum 80, plate-like septums 81 and 83, as seen in FIG. 6, are mounted on top and bottom and extend between finger ducts 40b and 42a, and 44b and 46a, respectively. Septums 81 and 83 respectively extend from the top and bottom of oven cavity 11 and terminate at conveyor 26. Septums 81 and 83 separate the return flow of air between top plenums (not shown) and between bottom plenums 78a and 78b. By separating the flow of air between the plenums and their associated finger ducts, the temperature may be varied between the plenums to provide for different rates of heating. For example, it may be desirable to utilize a temperature profile in which the temperature of the air in plenum 78b is greater than that in plenum 78a, thus using plenum 78b to cook the food product and using plenum 78a to brown or temper the food product.

Referring to FIGS. 3 and 6, finger ducts 40a, 40b, 42a and 42b, have respective tapered edges 82a, 82b, 84a, and 84b. Similarly, finger ducts 44a, 44b, 46a, and 46b, have respective tapered edges 86a, 86b, 88a, and 88b. Referring in particular to FIG. 3, when air is expelled out through apertures 48, it will tend to be pulled forward and sucked down through the V-shaped space 90 between finger ducts 46a and 46b. Since space 90 is very small near plenum 78b, air will not tend to exit through space 90 but will be instead pushed toward the end of the finger. Thus, the air tends to be pushed forward the length of finger ducts 46a and 46b and recirculated back toward plenum 78b. The heated air furthest from plenum 78b is recirculated since the lack of air flow through space 90 near plenum 78b temporarily starves fan 69b, and the only air available to fan 69b is this heated air. Space 90 also tends to restrict the amount of cold air entering plenum 78b from the conveyor opening 24 since most of the cold air enters through space 90 near plenum 78b, which is now restricted.

Figure 10:
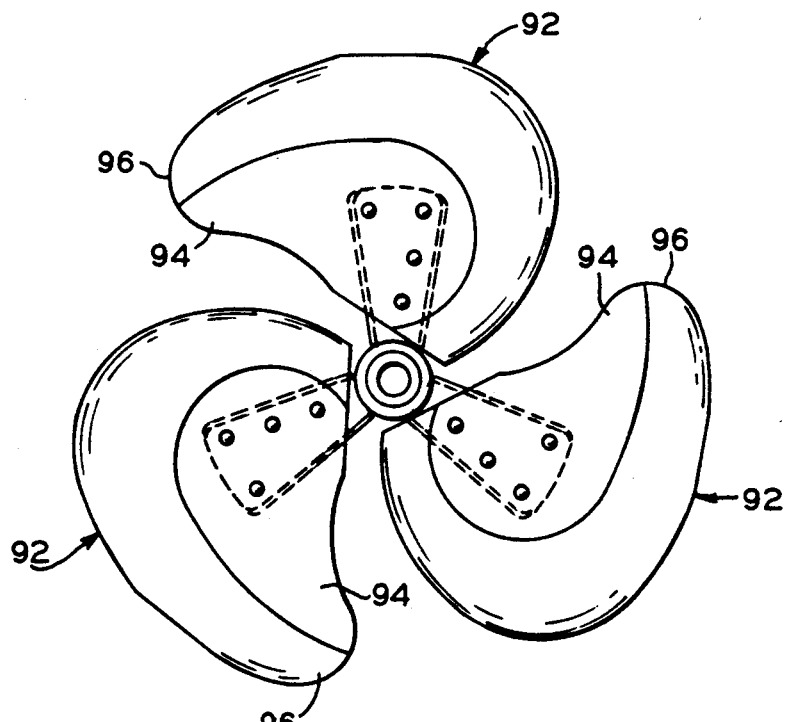
FIG. 10 is a front elevational view of the fan of the preferred embodiment in FIG. 1.

Referring now to FIG. 10, there is shown scoop type fan 69 having blades 92 which are secured to the remote end of border shaft 74. This fan is generally described in U.S. Pat. No. 4,626,661, assigned to the assignee of the present invention and is incorporated herein by reference. The difference between the fan described in the aforementioned patent and the fan of the present invention is that the leading edge portion 94 of fan 69 of the present invention does not taper to a point. Instead, edges 96 are rounded and thus effectively eliminate undesirable harmonic and centrifugal loads.

To prevent overheating and eventual failure of the various electronic components comprising the oven control circuitry, a double wall assembly 98 is disposed on the bottom portion of control assembly 36 as shown in FIG. 2. An identical double wall assembly 98 is disposed on the bottom portion of control assembly 34. This double wall assembly is described in U.S. Pat. No. 4,539,469, assigned to the assignee of the present invention and incorporated herein by reference.

Referring in particular to double wall assembly 98, there is shown in FIGS. 2, 4, and 5, mounting wall 100, a spaced apart exterior wall 102, which is on the opposite side of mounting wall 100 from oven control circuitry 104, and continuous side wall 106. Mounting wall 100, exterior wall 102, and continuous side wall 106 form therebetween a ventilating compartment 108 having a plurality of inlets 110 disposed in mounting wall 100 for receiving a flow of cooling air thereto. The flow of cooling air passing through inlet 110 and ventilating compartment 108 exhausts through a plurality of apertures 112 disposed in exterior wall 102. Air is also passed through openings 111 in compartment 43. Openings 111 each include a louver-like deflector 113 disposed downwardly and laterally to direct the flow of exhausting cooling air in a downwardly and lateral direction. The flow of air exiting through apertures 112 and openings 111 create an air buffer zone or air curtain to prevent the warmer radiating heat from a lower oven from reaching control circuitry 104.

In order to provide the coolest air available for cooling control circuitry 104, a central air duct 114 is mounted on back wall 38 of each oven 10 as shown in FIGS. 2 and 3 for drawing cool air from the floor level. Central duct 114 includes a downwardly facing opening 116 near floor level, a closed top end 118, and side walls 120 and 122, each of which having a plurality of exit openings 123. Each exit opening 123 is associated with a control assembly 34, 36.

Referring to FIG. 2, box-like conduits 124 and 126 are shown in communication with central duct 114 and control assemblies 34 and 36. To illustrate the flow of cooling air through one control assembly, a squirrel cage fan 128 is mounted on sidewall 130 of enclosure 37C to direct cooling air through inlet 132 and into circuitry compartment 43C. In operation, fan 128 draws air in from opening 116, up through duct 114, through exit opening 123 and into conduit 126C, through exit opening 127 of conduit 126C, and into enclosure 37C. There, the cooling air is drawn through inlet 132, whereupon it cools control circuitry 104. As illustrated in FIG. 2, the cooling air drawn through opening 116 travels through exits 123 to enter control assemblies 34A, 34B, 34C, 36A, and 36B in an identical manner, wherein a portion of the cooling air through duct 114 is diverted through each exit 123. In this manner, the control circuitry 104 of each stacked oven is cooled by floor level air.

While this invention has been described as having a preferred embodiment, it will be understood that it is capable of further modifications. This application is therefore intended to cover any variations, uses, or adaptations of the invention following the general principals thereof, and including such departures from the present disclosure as come within known or customary practice in the art to which this invention pertains.

What is claimed is:

1. An impingement food preparation apparatus comprising:
    an enclosure including a cooking chamber for cooking a food product therein;
    supporting means in said cooking chamber for supporting the food product;
    a plurality of finger duct members mounted in said cooking chamber and spaced from said supporting means, each of said duct members including a plurality of nozzles therein and pair of sidewalls, said nozzles being shaped and positioned to direct a plurality of discrete streams of impinging air toward said supporting means;
    means forming a plenum in said enclosure connected to said duct members in fluid communication therewith to provide a flow of air thereto, said plenum means having a front wall with a plurality of openings connected to respective said duct members and an air intake opening therein;
    means for heating the flow of air before it enters the plenum;
    means for drawing air from said chamber into said plenum; and
    adjacent said sidewalls of adjacent said ducts being tapered relative to each other to define an air return space outwardly tapered in a direction away from said plenum.

2. The apparatus of claim 1, wherein one said sidewall of each said duct is tapered inwardly in a direction away from said plenum means.

3. An impingement food preparation apparatus comprising:
    an enclosure including a cooking chamber for cooking a food product therein;
    supporting means in said cooking chamber for supporting the food product;
    a plurality of finger duct members mounted in said cooking chamber and spaced from said supporting means, each of said duct members having a wall including a plurality of nozzles therein shaped and positioned to direct a plurality of discrete streams of impinging air toward said supporting means;
    means forming a plenum in said enclosure connected to said duct members in fluid communication therewith to provide a flow of air thereto, said plenum means having a front wall with a plurality of openings connected to respective said duct members and a rear wall with an opening therein;
    means for heating the flow of air before it enters the plenum means;
    impeller means for drawing air from said chamber into said plenum means; and
    a plurality of air deflector means secured to an inner surface of each said duct member for deflecting air through said nozzles, said deflector means being axially spaced along said duct, said plurality of deflector means being spaced from said wall including said plurality of nozzles whereby the deflected air will form said plurality of discrete streams of impinging air exiting through said nozzles.

4. The apparatus of claim 3, wherein said air deflector means comprises a plurality of air distribution vanes secured to said inner surface of each said duct member.

5. The apparatus of claim 4, wherein each said distribution vane is scoop shaped.

6. The apparatus of claim 4, wherein each said distribution vane extends substantially the width of said duct member.

7. In a food preparation apparatus including at least two ovens stacked one above another, an upper one of said ovens being directly exposed to heat rising from a lower one of the ovens, each said oven having a cooking chamber and oven control circuitry, a cooling system for insulating and cooling the oven control circuitry of each said upper one of said ovens from a source of radiant heat, said cooling system comprising:
    a double wall assembly having a mounting wall including first and second sides, the oven control circuitry being mounted on said first side, and an exterior wall spaced apart from said second side of said mounting wall, said mounting wall and said exterior wall forming therebetween a compartment having an inlet for receiving a flow of cooling air and an outlet in said exterior wall for exhausting the flow of air; and means for drawing cool air from near floor level and moving said flow of air upwardly and into said inlet, through said compartment and out of said outlet for forming a circulation of cool air adjacent said oven, whereby said oven control circuitry is substantially insulated from said source of radiant heat by the flow of cool air between said mounting wall and said exterior wall.

8. The apparatus of claim 7, wherein each said oven further comprises an enclosure mounted on said mounting wall and enclosing said oven control circuitry therein, said enclosure including an intake opening and an exhaust opening in communication with said inlet in said compartment and wherein said air moving means is disposed in said enclosure for drawing said flow of cool air through said intake opening and over said oven control circuitry and out of said exhaust opening to said inlet, whereby the air cools said oven control circuitry and thereafter passes through said inlet, said compartment and out of said outlet.

9. The apparatus of claim 8 having a front wall and a back wall, wherein said means for drawing cool air includes a central cooling duct mounted on the back wall and having a downwardly facing opening near floor level.

10. The apparatus of claim 9, wherein said central cooling duct includes two sidewalls, each said sidewall having a plurality of exit openings therein, each said exit opening in communication with a corresponding said intake opening.

11. The apparatus of claim 10, wherein said cooling system further comprises an auxiliary cool air duct associated with each said enclosure, said duct having a first opening in communication with said exit opening and a second opening in communication with said intake opening.

12. The apparatus of claim 9, wherein said air moving means comprises a squirrel cage fan.

13. The apparatus of claim 9, including a plurality of said outlets in said exterior wall, wherein said outlets open substantially toward said source of radiant heat to deflect heat therefrom away from said oven control circuitry by the flow of air exhausted from said outlets.

* * * * *